United States Patent [19]

Ikeda et al.

[11] Patent Number: 5,651,300

[45] Date of Patent: Jul. 29, 1997

[54] BOOSTER

[75] Inventors: Masahiro Ikeda; Tohru Satoh, both of Saitama-ken, Japan

[73] Assignee: Jidosha Kiki Co., Ltd., Tokyo, Japan

[21] Appl. No.: 612,111

[22] Filed: Mar. 7, 1996

[30] Foreign Application Priority Data

Mar. 24, 1995 [JP] Japan .................................. 7-091835
Mar. 31, 1995 [JP] Japan .................................. 7-099939

[51] Int. Cl.$^6$ ...................................... F15B 9/10
[52] U.S. Cl. ...................................... 91/376 R
[58] Field of Search .................................. 91/376 R

[56] References Cited

U.S. PATENT DOCUMENTS

| | | | |
|---|---|---|---|
| 3,548,718 | 12/1970 | Utton | 91/376 R |
| 4,005,638 | 2/1977 | Takeuchi | 91/376 R |
| 5,027,695 | 7/1991 | Inoue et al. | |
| 5,046,398 | 9/1991 | Hamamiya et al. | |
| 5,263,399 | 11/1993 | Flory et al. | 91/376 R |
| 5,333,534 | 8/1994 | Uyama | |
| 5,355,771 | 10/1994 | Watanabe | |

FOREIGN PATENT DOCUMENTS 2157378  10/1985  United Kingdom ................. 91/376 R Primary Examiner—F. Daniel Lopez
Attorney, Agent, or Firm—Flynn, Thiel, Boutell & Tanis, P.C.

[57] ABSTRACT

An improvement of a valve mechanism used in a brake booster is disclosed. A valve element comprises a first and a second annular member, both formed of a metal and which are connected together in an axial orientation, and an elastic deformation which is connected to the rear side of the second annular member. A rubber piece mounted on the first annular member defines a first seat area, and a rubber piece mounted on the second annular member defines a second seat area. With this construction, a spring which is used to urge either seat area of the valve element into seating engagement with the respective valve seat may be compressed to a lower load than in the prior art, thus allowing an input required to initiate the operation of the brake booster to be reduced.

7 Claims, 6 Drawing Sheets

BOOSTER

FIELD OF THE INVENTION

The invention relates to a booster as may be used in a brake of an automobile or the like, and more particularly, to an improvement of a valve mechanism thereof.

DESCRIPTION OF THE PRIOR ART

A booster is known in the art comprising a tubular valve body slidably disposed within a shell, an annular, first valve sheet formed around the inner periphery of the valve body, a valve plunger slidably fitted into the valve body and connected to an input shaft, an annular, second valve seat formed on the valve plunger, a substantially tubular valve element including an elastic deformation at its rear portion which is connected to the inner periphery of the valve body and adapted to be seated on the first and the second valve seat, a vacuum valve formed by the first valve seat and a first seat area of the valve element which moves into engagement with and disengagement from the first valve seat, and an atmosphere valve formed by the second valve seat and a second seat area of the valve element which moves into engagement with or disengagement from the second valve seat.

In a conventional booster as mentioned, when the booster is operated, the atmosphere valve is opened while the vacuum valve is closed. At this time, a region located on the exterior of the first seat (vacuum valve) is subject to a negative pressure while a region on the interior thereof is subject to the atmosphere. Accordingly, a resulting pressure differential acting across the valve element urges it forwardly. However, the force with which the valve element is urged is not large enough to be capable of maintaining a hermetic seal around the first seat area, and hence the valve element is urged forwardly by a spring in order to maintain a hermetic seal around the first seat (vacuum valve).

It is to be noted, however, that in the conventional booster as mentioned, the first and the second seat area of the valve element are formed on concentric circles, and the diameter of the first sheet area (vacuum valve) is designed to be greater than the diameter of the second seat area (atmosphere valve).

Accordingly, when the booster is operated, a pressure-responsive area of the valve element which is subject to the pressure differential is reduced, with the consequence that the spring which is used to maintain a hermetic seal around the first seat (vacuum valve) of the valve element must be set to a higher load. This resulted in a disadvantage in the prior art that an input to initiate the operation of the booster becomes increased.

SUMMARY OF THE INVENTION

In view of the foregoing, in a booster as mentioned, in accordance with the invention, the valve element comprises a first annular member located forwardly and formed of a rigid material, and a second annular member also formed of a rigid material and having the first annular member connected to the front side thereof and having the elastic deformation connected on its rear side. The first annular member includes an annular, first elastic member which defines the first seat area, and the second annular member includes an annular, second elastic member which defines the second seat area. At least one of the first or the second annular member is formed with an axially extending tubular portion, into which the other member is fitted so that the both members may be connected while causing them to axially abut against each other. An annular seal member is axially held between the first and the second annular member, thus maintaining a hermetic seal between the first and the second annular member.

With this construction, the first and the second seat area may be axially separated from each other, so that when the booster is operated, a pressure-responsive area upon which a pressure differential across the valve element acts can be increased. This allows the load with which the spring, used to maintain the hermetic seal around the first seat area (vacuum valve) upon operation of the booster must be tensioned, to be reduced, thus reducing the input required to initiate the operation of the booster as compared with the prior art.

Since the both annular members on which the both seat areas are defined are formed of a rigid material and since they are connected together by being disposed in axial abutment against each other, both seat areas can be positively maintained parallel to each other despite both seat areas being axially separated from each other. In addition, since the seal member mentioned maintains a hermetic seal between the both annular members, any leakage through the seal between the both annular members, formed of a rigid material, can be reliably prevented.

Above and other objects, features and advantages of the invention will become apparent from the following description of several embodiments thereof with reference to the drawings.

DETAILED DESCRIPTION OF EMBODIMENT

Figure 1:
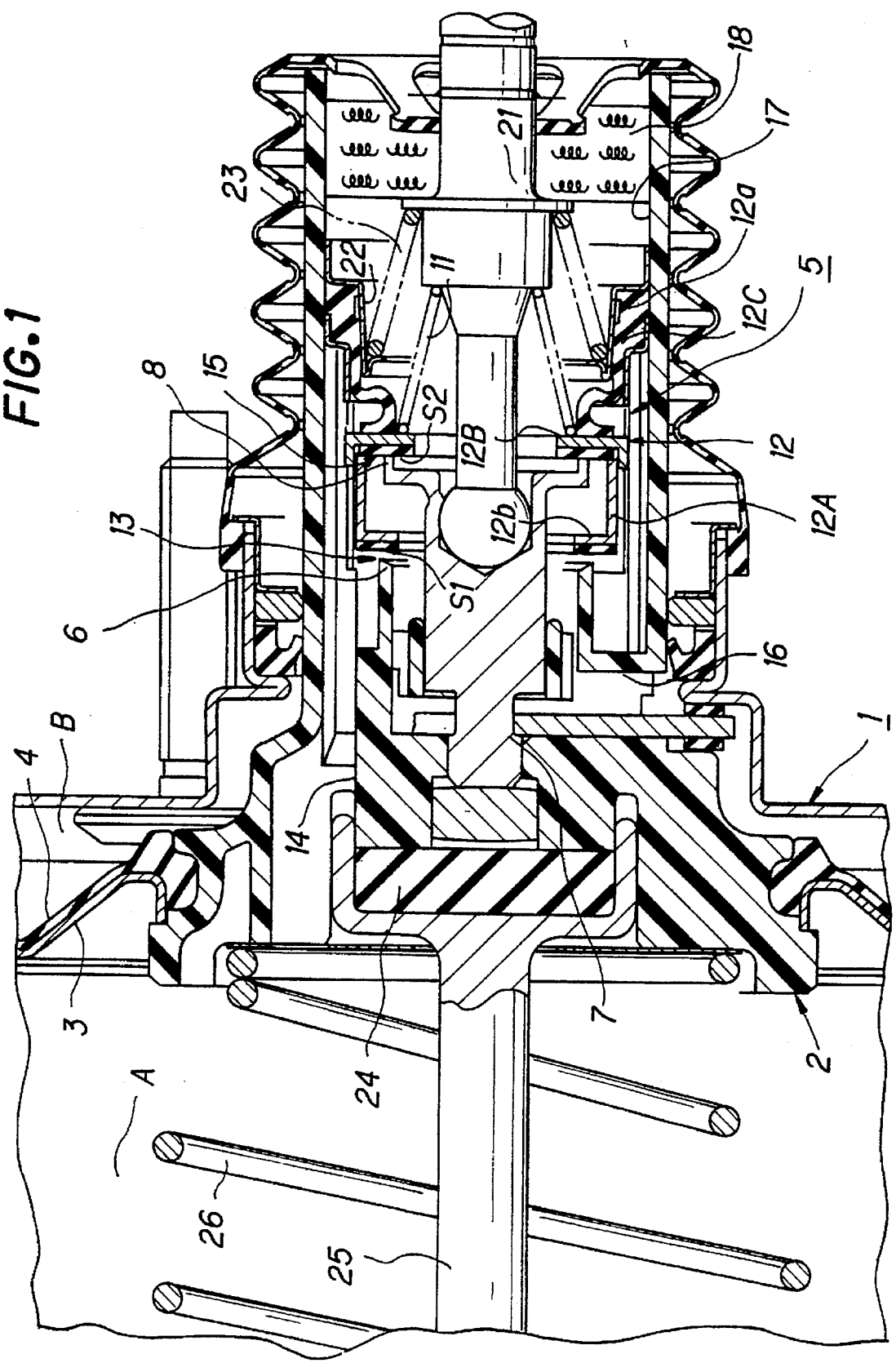
FIG. 1 is a longitudinal section of one embodiment of the invention.

Referring to the drawings, several embodiments of the invention will now be described. Initially referring to FIG. 1, a brake booster includes a shell 1 in which a substantially tubular valve body 2 is slidably disposed. A power piston 3 is connected around the outer periphery of the valve body 2, and a diaphragm 4 is applied to the back surface of the power piston 3, thereby dividing the interior of the shell 1 into a constant pressure chamber A and a variable pressure chamber B.

A valve mechanism 5, which switches a fluid circuit between the constant pressure chamber A and the variable pressure chamber B, is disposed within the valve body 2, and comprises an annular, first valve seat 6 formed around the inner peripheral surface of the valve body 2, an annular, second valve seat 8 formed on the rear end of a valve plunger 7 which is slidably disposed within the valve body 2, and a substantially tubular valve element 12 which is adapted to be seated upon either valve seat 6 or 8 from the right, as viewed in FIG. 1, under the resilience of a spring 11.

A combination of the first valve seat 6 and a first seat area S1 of the valve element 12, which moves into engagement with or disengagement from the first valve seat 6 defines a vacuum valve 13. A space located radially outward of the vacuum valve 13 communicates with the constant pressure chamber A through a constant pressure passage 14 formed in the valve body 2. A negative pressure is normally introduced into the constant pressure chamber A through a tubing, not shown.

A combination of the second valve seat 8 and a second seat area S2 of the valve element 12, which moves into engagement with or disengagement from the second valve seat 8 defines an atmosphere valve 15. A space located intermediate the atmosphere valve 15 and the vacuum valve 13 communicates with the variable pressure chamber B through a variable pressure passage 16 formed in the valve body 2.

A space located radially inward of the atmosphere valve 15 communicates with the atmosphere, acting as a source of pressure, through an atmosphere passage 17 formed in the valve body 2, with a filter 18 being disposed in the atmosphere passage 17.

The rear end of the valve plunger 7 is pivotally connected to the free end of an input shaft at 21, the terminal end of which is connected to a brake pedal, not shown. The input shaft 21 includes a step, and a spring 23 which is compressed to a given load is disposed between the step on the input shaft and a retainer 22 which secures an end 12a of the valve element 12 to the valve body 2. Under the resilience of the spring 23, the input shaft 21 is urged rearwardly where it remains stationary at an inoperative position shown.

On the other hand, a reaction disc 24 is disposed forwardly of the valve plunger 7, and a rear end of a push rod 25 is fitted around the reaction disc 24. The front end of the push rod 25 slidably extends through a front wall of the shell 1 to the outside thereof for connection with a piston of a master cylinder, not shown.

The valve body 2 is urged rearwardly by a return spring 26, and normally assumes an inoperative position shown. Under the inoperative condition of the brake booster as shown in FIG. 1, the vacuum valve 13 is open while the atmosphere valve 15 is closed. At this time, the front side of the valve element 12 assumes a negative pressure while the rear side thereof assumes an atmospheric pressure. Accordingly, a pressure differential across the valve element 12 urges it forwardly, but because the resilience of the spring 13 exceeds such bias resulting from the pressure differential, the valve element 12 and the input shaft 21 remain at rest in the inoperative position shown.

The described construction and an associated operation remain unchanged from those known in the art.

However, in the present embodiment, the valve element 12 is improved so that an input required to initiate the operation of the brake booster may be reduced.

Figure 2:
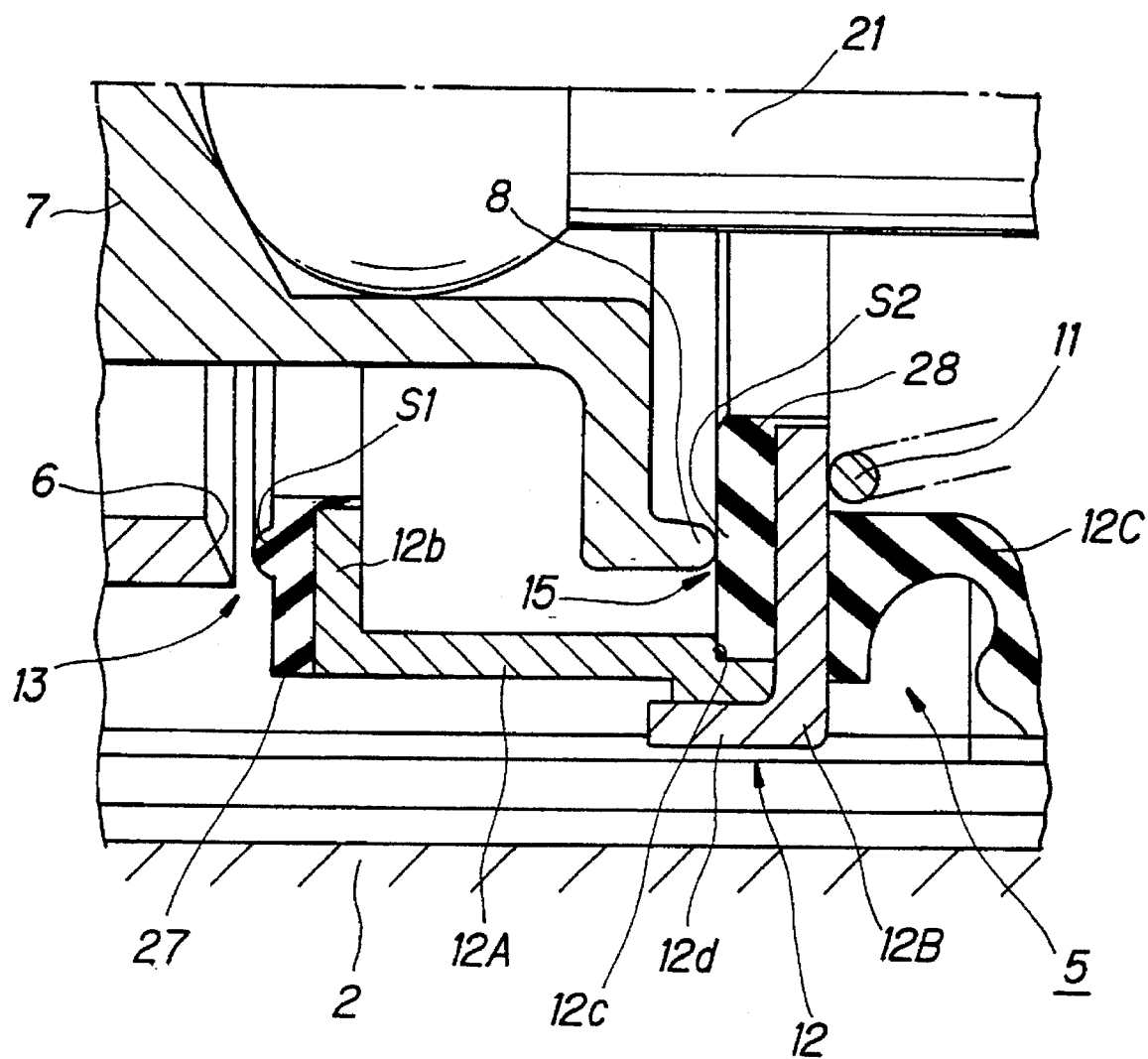
FIG. 2 is an enlarged view of an essential part shown in FIG. 1.

Specifically, referring to FIG. 2 which shows the valve element to an enlarged scale, the valve element 12 of the present embodiment comprises a cylindrical, first annular member 12A formed of a metal at its foremost position, and a second annular member 12B, also formed of a metal and which is disposed rearwardly of the first annular member 12A. In addition, the valve element 12 comprises a cylindrical, elastic deformation 12C which is formed of rubber and which is connected to the rear side of the second annular member 12B. The rear end of the elastic deformation 12C is formed to an increased thickness, which forms the end 12a. As mentioned before, the end 12a is secured to the inner peripheral surface of the valve body 2 by the retainer 22.

The first annular member 12A includes a radial portion 12b at its front end which extends radially inward. An annular rubber piece 27 is applied to the front end face of the radial portion 12b and defines the first seat area S1. At its rear end, the first annular member 12A has a diameter which is increased as compared with a diameter of the front end, thereby forming a stepped end face 12c, facing rearward, around the inner peripheral surface of the rear end of the first annular member 12A.

Figure 3:
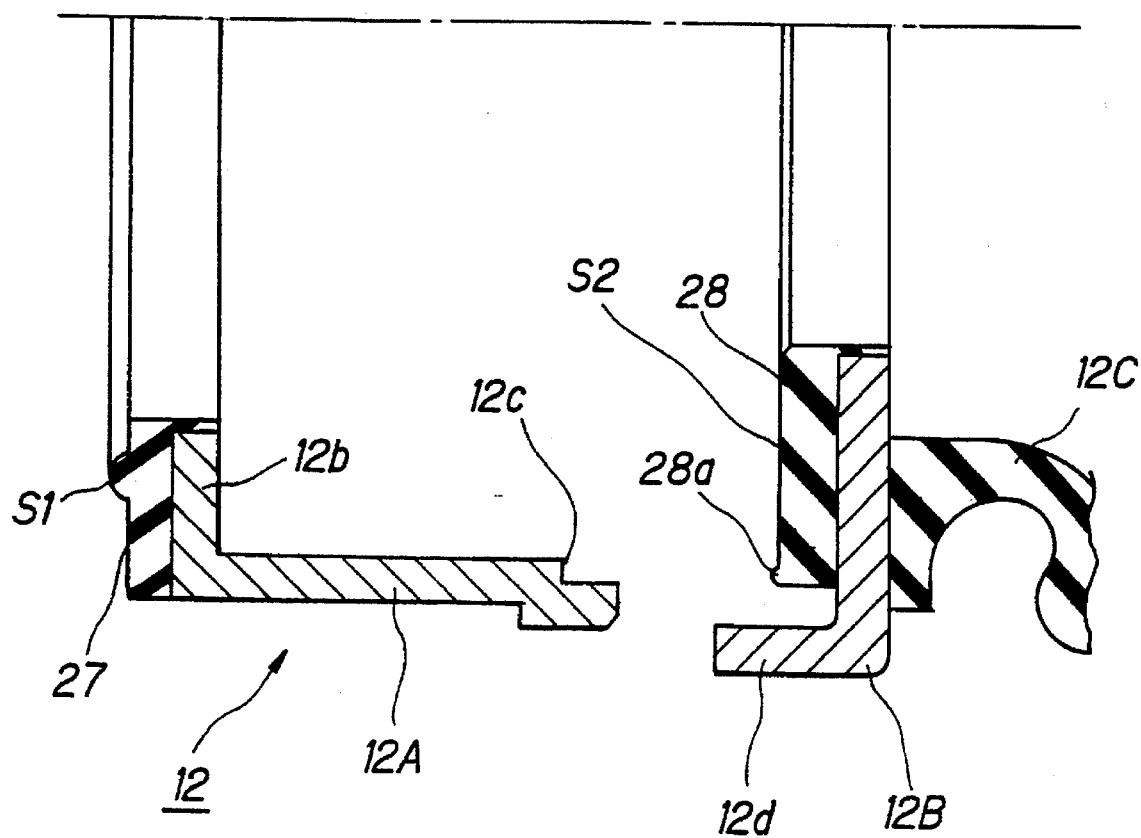
FIG. 3 is a cross section illustrating a valve element 12 shown in FIG. 2 before it is assembled.

The second annular member 12B is substantially in the form of a disc and includes a tubular portion 12d which extends axially forwardly from the outer periphery thereof. The internal diameter of the tubular portion 12d is chosen to be equal to or slightly less than the external diameter of the rear end of the first annular member 12A, and the tubular portion 12d has an axial size which is greater than the axial size of the rear peripheral portion of the first annular member 12A which has an increased diameter. An annular piece of rubber 28 is applied to the front end face of the second annular member 12B and defines the second seat area S2 mentioned above. The thickness of the rubber piece 28 is chosen to be equal to or slightly greater than the axial size of the rear portion of the first annular member 12A which has an increased diameter. The external diameter of the rubber piece 28 is chosen to be equal to the inner diameter of the rear portion of the first annular member 12A which has an increased diameter. As shown in FIG. 3 which illustrates the valve element 12 before it is assembled, the front end face of the rubber piece 28 is formed with an annular projection 28a around its outer periphery which bulges in a forward direction. The front end of the elastic deformation 12C, formed of rubber, is connected to the rear end face of the second annular member 12B.

In the present embodiment, the diameter of the first seat area S1 and the diameter of the second seat area S2 are chosen to be substantially equal to each other. In other words, in the present embodiment, the both valve seats 6, 8 have approximately equal size. Thus, in contradistinction to the construction of a conventional valve element such as the valve element 12, the both seat areas S1, S2 have a substantially equal diameter and are axially displaced from each other.

The first and the second annular member 12A, 12B, which are constructed in the manner mentioned above, are manufactured separately as illustrated in FIG. 3, and are then integrally connected together. Thus, in the present embodiment, the first annular member 12A is manufactured by a pressing process, and the rubber piece 27 which constitutes the first seat area S1 is cemented to the radial portion 12b of the first annular member 12A, thus forming the front portion of the valve element 12. The second annular member 12B is also manufactured by a pressing process, and the rubber piece 28 which constitutes the second seat area S2 is cemented to the front end face thereof while the front end of the elastic deformation 12C is cemented to the rear end face of the member 12B, thus forming the rear portion of the valve element 12. As mentioned, the rubber piece 28 cemented to the front side of the second annular member 12B is formed with the annular projection 28a.

After manufacturing the front and the rear portion which constitute together the valve element 12, the outer periphery of the rear portion, having an increased diameter, of the first annular member 12A is disposed as a press fit into the tubular portion 12d of the second annular member 12B, and the rear end of the first annular member 12A is disposed in abutment against the exposed front end face of the second annular member 12B, thus connecting the both members integrally together (see FIG. 2). When the both members are connected together in this manner, the annular projection 28a of the rubber piece 28 abuts against the stepped end face 12c of the first annular member 12A, whereby the location where the anular projection 28a is disposed is held sandwiched between the stepped end face 12c of the first annular member 12A and the front end face of the second annular member 12B.

It is to be noted that in the present embodiment, the spring 11 which causes the both seats S1, S2 of the valve element 12 to be seated upon either valve seat 6, 8 is disposed between the rear end face of the second annular member 12B, forming the valve element 12, and a step formed on the input shaft 21.

As will be noted from FIG. 2, the first valve seat 6 in the present embodiment is formed by a spherical recess. An imaginary sphere which defines such spherical recess has its center located at a point where the terminal end, not shown, of the input shaft 21 is connected to the brake pedal. Thus, in the present embodiment, the vacuum valve 13 is formed by the first valve seat 6 comprising a spherical recess and the first seat area S1 formed by the annular projection on the rubber piece 27.

With the present embodiment, the both seat areas S1, S2 have substantially an equal diameter, and are axially displaced or separated from each other.

Accordingly, in the operative condition of the brake booster when the atmosphere valve 15 is opened while the vacuum valve 13 is closed, the pressure-responsive area subject to the pressure differential developed across the valve element 12 and acting upon the valve element 12 can be increased. This means that the first seat area S1 is urged into seating engagement with the first valve seat 6 under the influence of the pressure differential with a greater force. This allows the load which must be preset upon the spring 11, used to maintain a hermetic seal around the first seat area S1 (vacuum valve 13), to be reduced, thus allowing an input from the input shaft 21 which is required to initiate the operation of the brake booster to be reduced.

In contrast to the arrangement of the present embodiment, in the prior art practice, a conventional valve element had a first seat area S1 and a second seat area S2 which are disposed on concentric circles, with the first seat area S1 having a diameter greater than that of the second seat area S2. With such a conventional valve element, a pressure-responsive area which is subject to a pressure differential developed across the valve element upon operation of the brake booster to act upon the valve element will be reduced, and this requires that a spring corresponding to the spring 11 be compressed to a higher load, resulting in a disadvantage that an input required to initiate the operation of the brake booster increases.

It is to be also noted that in the present embodiment, the both annular members 12A, 12B on which the seat areas S1, S2 are defined are formed of rigid metal, and are connected together in axial abutment against each other. Accordingly, despite the both seat areas S1, S2 are axially separated from each other, it is possible that the both seat areas S1, S2 be reliably maintained parallel to each other. This favorably prevents a failure of the hermetic seal around the vacuum valve 13 from occurring under a medium load condition which prevails after initiating the operation of the brake booster.

In addition, since the first valve seat 6 forming the vacuum valve 13 is defined by a spherical recess as mentioned previously, if the first seat area S1 be seated upon the first valve seat 6 in a slightly tilted position, a reliable contact between the first seat area S1 and the first valve seat 6 is assured over the entire circumferential range, again favorably preventing a failure of the hermetic seal around the vacuum valve 13 under medium load condition which prevails after initiating the operation of the brake booster.

Finally, even though the both annular members 12A, 12B are formed of a metal and fit each other, the presence of the annular projection 28a on the rubber piece 28 which is axially held between the both members favorably prevents a failure of a hermetic seal between the both members 12A, 12B.

Second Embodiment

Figure 4:
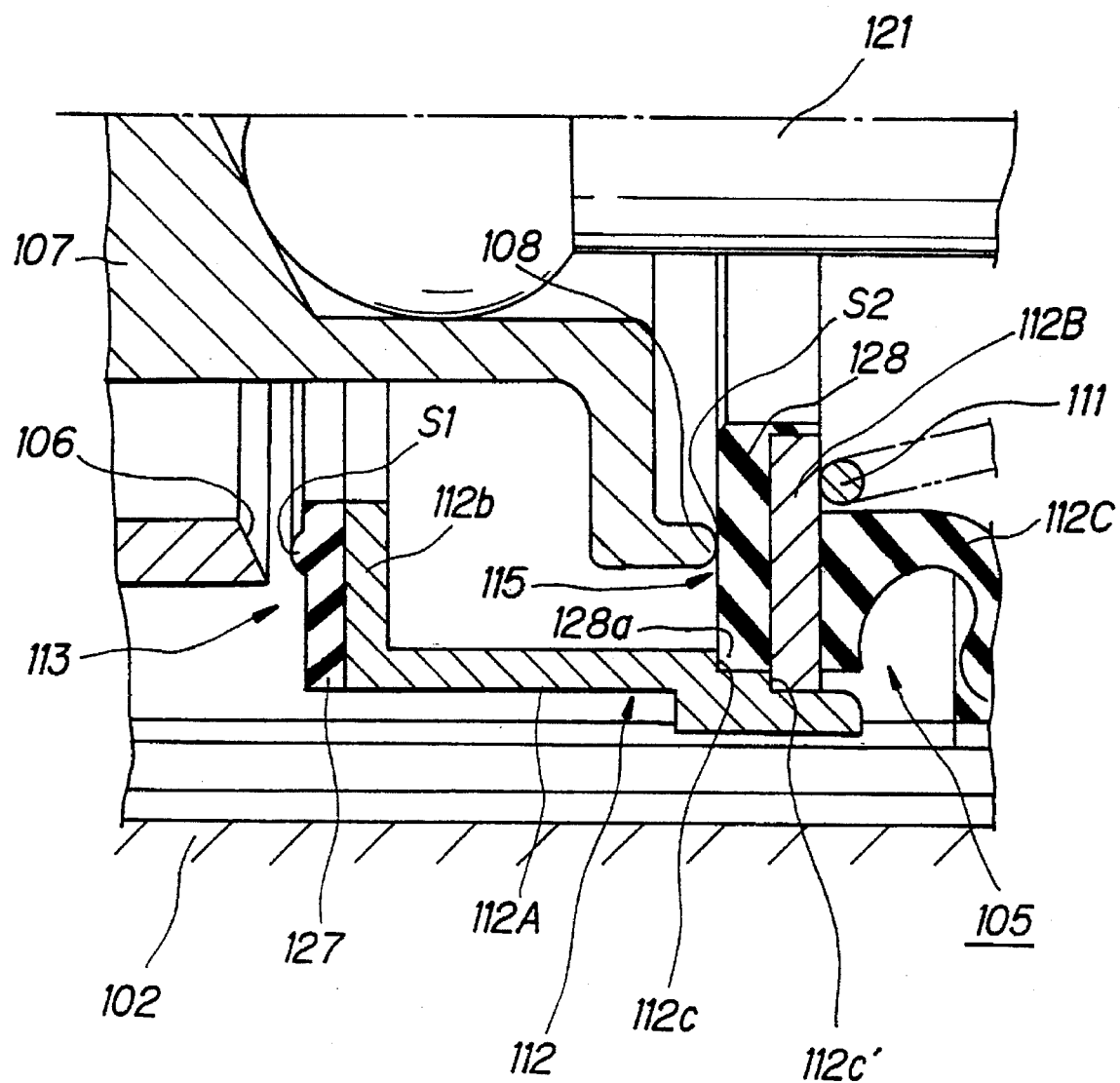
FIG. 4 is a cross section of another embodiment of the invention.

FIG. 4 shows a second embodiment of the invention where a second annular member 112B only comprises a radially disposed disc, eliminating a tubular portion corresponding to that shown at 12d illustrated in the first embodiment. On the other hand, a first annular member 112A is formed with a pair of stepped end faces 112c, 112c' toward its rear end with successively increasing diameters. In other respects, the arrangement is similar to that of the first embodiment, and parts corresponding to those shown in the first embodiment are designated by like numerals as used before to which 100 is added.

In the second embodiment thus constructed, the second annular member 112B is disposed as a press fit into the inner peripheral surface of the rearmost portion of the first annular member 112A having an increased diameter, and the front end face of the second annular member 112B is disposed in abutment against the rearmost stepped end face 112c', thus integrally connecting the both members 112A, 112B together. As a result of such arrangement, an annular projection 128a abuts against the stepped end face 112c which is forwardly located, and the location where such projection is provided is axially held between the stepped end face 112c and the second annular member 112B. This embodiment again achieves a similar functioning as described above in connection with the first embodiment.

Incidentally, it is to be noted that even though the first annular member 112A is cylindrical and the second annular member 112B is a radially disposed disc in the second embodiment shown in FIG. 4, alternatively, the first annular member 112A may comprise a radially disposed disc while the second annular member 112B may be cylindrical. In such instance, an annular rubber piece may be cemented to the rear end face of the first annular member 112A which then assumes the configuration of a disc.

Third Embodiment

Figure 5:
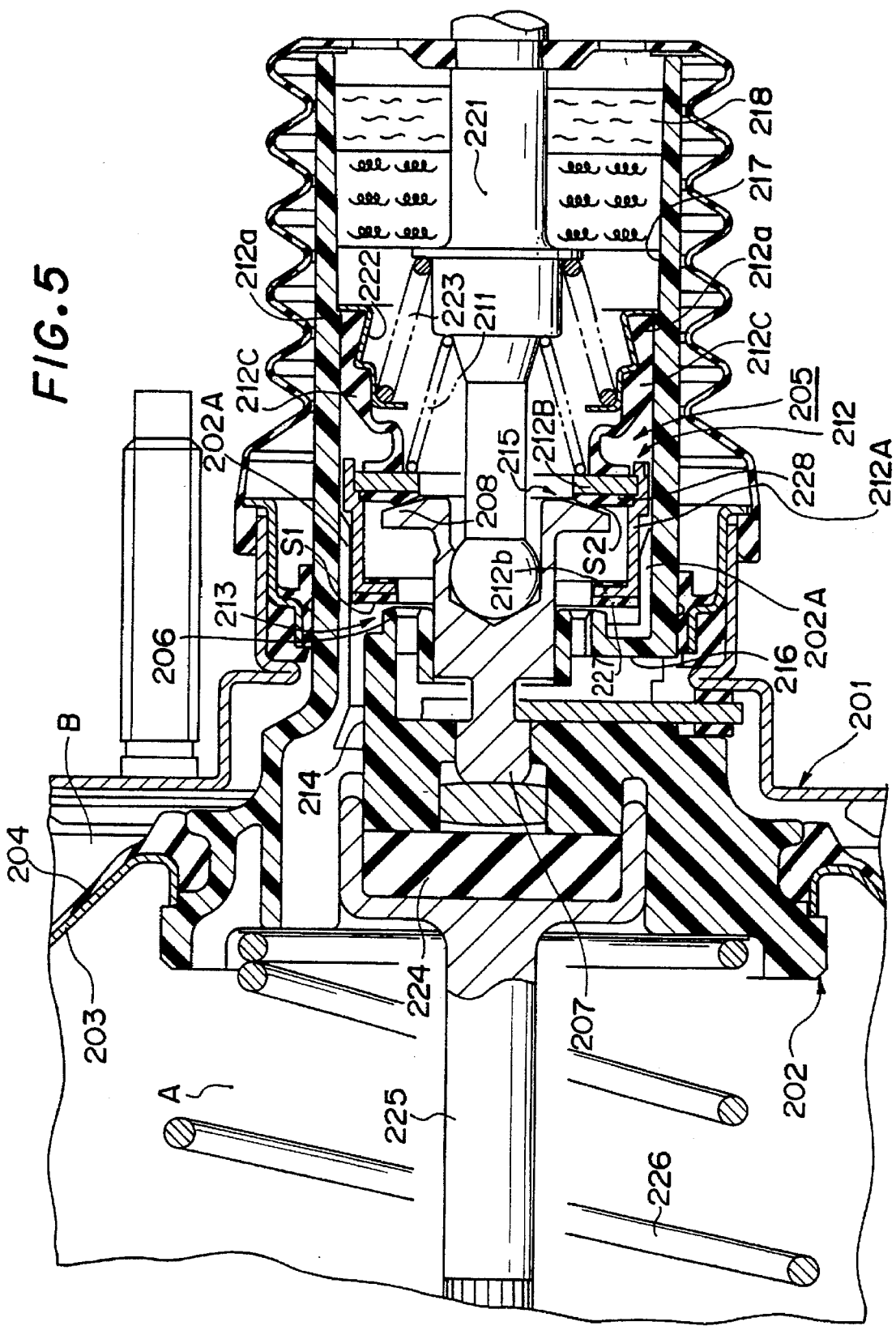
FIG. 5 is a longitudinal section of a further embodiment of the invention.

FIG. 5 shows a third embodiment of the invention where a first annular member 212A and a second annular member 212B are constructed in the same manner as corresponding parts shown in the second embodiment, and they are fitted together in the same manner as in the second embodiment, whereupon the right end of the first annular member 212A is staked around its outer periphery, thus connecting the first annular member 212A and the second annular member 212B together in a more firm manner.

It is to be noted that a retainer 222 used in the third embodiment is different from a corresponding part used in the described embodiments, but instead includes a plurality of steps, which are effective to secure firmly an end 212a of a valve element 212 to the inner periphery of a valve body 202.

Also, in the third embodiment, a second valve seat 208 and a second seat area S2 are configured differently from corresponding parts of the described embodiments, but are configured in a similar manner as conventionally known in the art. Also, a first valve seat 206 differs from a corresponding part in the described embodiments, but comprises an annular projection which bulges rearwardly. In a corresponding manner, a first seat area S1 comprises a flat end face of a rubber piece 227.

Finally, it is the most distinctive feature of the third embodiment that the inner periphery of the valve body 202 is formed with a plurality of rearwardly extending ribs 202A at a location rearward of the first valve seat 206. The ribs 202A are disposed at an equal circumferential spacing, and have an equal height or an amount of bulge in the radially inward direction. The outer periphery of the first annular member 212A slidably fits around the plurality of ribs 202A at its front end.

In other respects, the arrangement is similar to that of the second embodiment shown in FIG. 4, and accordingly, corresponding parts are designated by like numerals as used in FIG. 4 to which 100 is added.

With the arrangement of the third embodiment, it is also possible to reduce the magnitude of an input required to initiate the operation of the brake booster, in the similar manner as described above in connection with the preceding embodiments. In particular, since a seal member 228 is held between the first annular member 212A and the second annular member 212B, a seal between these members can be reliably maintained. In addition, in this third embodiment, under a medium load condition which prevails after initiating the operation of the brake booster, the first annular member 212A forming the valve element 212 is guided by the plurality of ribs 202A while moving relative to the valve body 202. In this manner, the axis of the valve element 212 can be maintained in alignment with the axis of the valve body 202, thereby favorably preventing the first seat area S1 which is seated on the first valve seat 206 from tilting. This allows any failure of the hermetic seal around the vacuum valve 213 to be prevented in an advantageous manner under a medium load condition.

Fourth Embodiment

Figure 6:
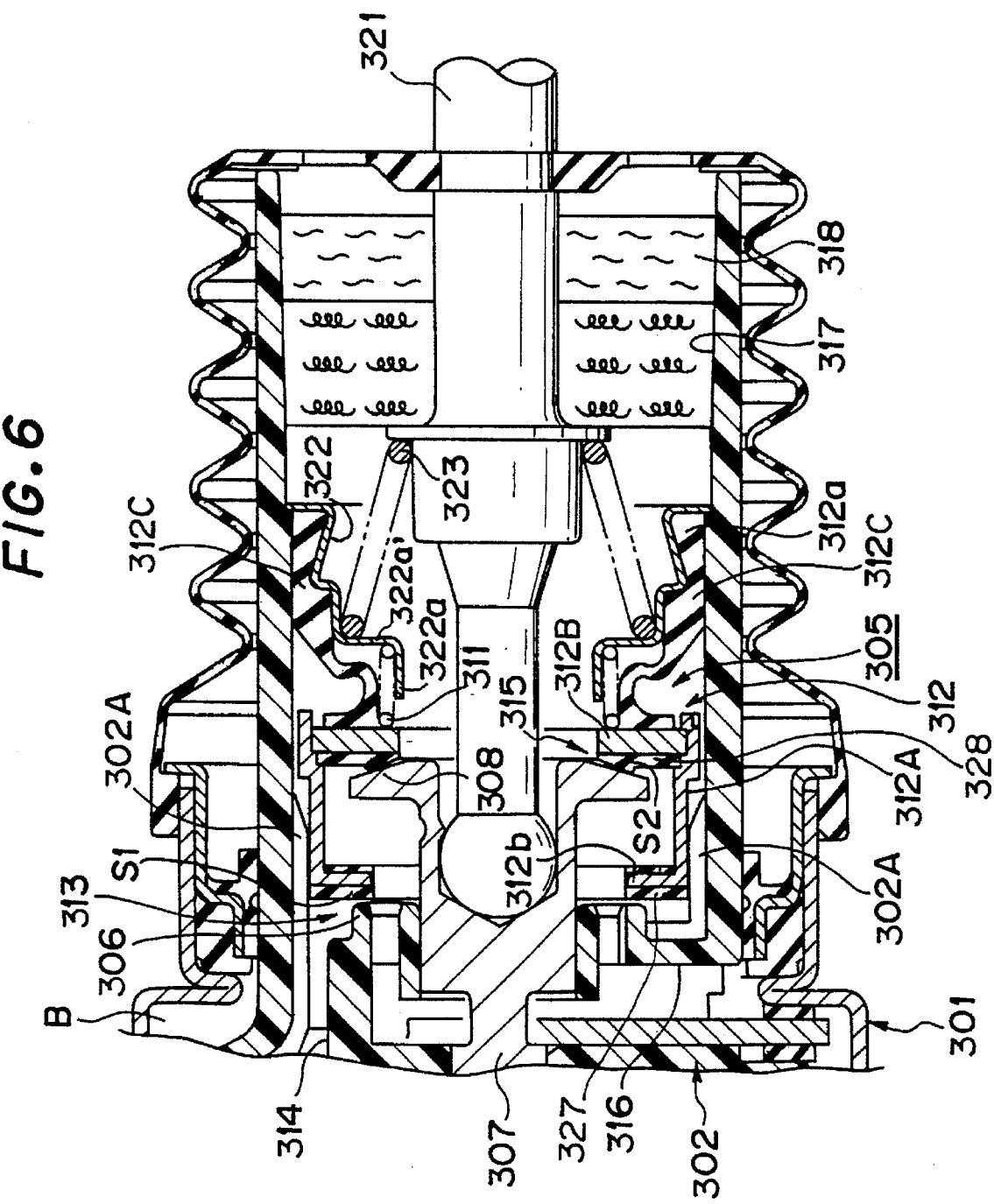
FIG. 6 is a longitudinal section of yet another embodiment of the invention.

FIG. 6 shows a fourth embodiment of the invention. In this embodiment, around the inner periphery, a front edge of a retainer 322 is extended axially forwardly to form a cylindrical portion 322a, and a cylindrical spring 311 is disposed between a stepped end face 322a', which is formed rearwardly of the cylindrical portion 322a, and a rear end face of a second annular member 312B of a valve element 312 which is disposed in opposing relationship with the end face. In other respects, the arrangement is similar to that of the third embodiment, and corresponding parts are designated by like reference numerals as used in FIG. 3 to which 100 is added. Again, a similar functioning as achieved in the third embodiment is obtained with this fourth embodiment.

While various embodiments have been described above as the invention is applied to a brake booster of single type, it should be understood that the invention is equally applicable to a booster of tandem or triple type.

While the invention has been disclosed above in connection with several embodiments thereof, it should be understood that a number of changes, modifications and substitutions therein are possible by one skilled in the art from the above disclosure without departing from the scope and spirit of the invention defined by the appended claims.

What is claimed is:

1. In a booster including a tubular valve body slidably disposed within a shell, an annular, first valve seat formed around an inner periphery of the valve body, a valve plunger slidably fitted into the valve body and connected with an input shaft, an annular, second valve seat formed on the valve plunger, a substantially tubular valve element including an elastic deformation at a rear portion thereof which is connected to the inner periphery of the valve body and adapted to be seated upon either the first or the second valve seat, a vacuum valve formed by the first valve seat and a first seat area of the valve element which moves into engagement with or disengagement from the first valve seat, and an atmosphere valve formed by the second valve seat and a second seat area of the valve element which moves into engagement with or disengagement from the second valve seat;

the improvement comprising the valve element having a first annular member which is formed of a rigid material, and a second annular member which is formed of a rigid material and which is disposed rearwardly of the first annular member, the second annular member including a forward portion which is connected to the first annular member and a rear portion to which the elastic deformation is connected, an annular, first elastic member mounted on the first annular member defining the first seat area, an annular, second elastic member mounted on the second annular member defining the second seat area, at least one of the first and the second annular members being formed with an axially extending tubular portion into which the other of the first and the second annular member is fitted so that both members are connected together by disposing both members in an axial abutment against each other, an annular seal member being axially disposed between the first and the second annular members to maintain a hermetic seal between the first and the second annular members, the first annular member being formed with an axially rearwardly extending tubular portion while the second annular member being formed with an axially forwardly extending tubular portion, the tubular portion of the first annular member receiving the tubular portion of the second annular member, a rear end of the tubular portion of the first annular member being disposed in abutment against an end face of the second tubular member, and the seal member being formed by the second elastic member, an annular projection being formed on a front end face of the second elastic member and is disposed in abutment against a stepped end face which is formed adjacent to an inner periphery of the tubular portion of the first annular member.

2. In a booster including a tubular valve body slidably disposed within a shell, an annular, first valve seat formed around an inner periphery of the valve body, a valve plunger slidably fitted into the valve body and connected with an input shaft, an annular, second valve seat formed on the valve plunger, a substantially tubular valve element including an elastic deformation at a rear portion thereof which is connected to the inner periphery of the valve body and adapted to be seated upon either the first or the second valve seat, a vacuum valve formed by the first valve seat and a first seat area of the valve element which moves into engagement with or disengagement from the first valve seat, and an atmosphere valve formed by the second valve seat and a second seat area of the valve element which moves into engagement with or disengagement from the second valve seat;

the improvement comprising the valve element having a first annular member which is formed of a rigid material, and a second annular member which is formed of a rigid material and which is disposed rearwardly of the first annular member, the second annular member includes a forward portion which is connected to the first annular member and a rear portion to which the elastic deformation is connected, at least one of the first and the second annular members having an axially extending cylindrical portion, the other of the first and the second annular members being fitted on the cylindrical portion, the first and second members being coupled together by engaging each other end to end in an axial direction;

an annular seal member being axially clamped between the first and the second annular members to maintain a gas tight seal therebetween;

a first elastic member and a second elastic member, which elastic members are provided on front and rear sides, respectively, of a radial portion of the coupled first and second annular members, the first and second elastic members comprising the first and second seat members, respectively;

the first and second valve seats being disposed at a distance from each other in the axial direction and have substantially the same size;

the first and second seats have substantially the same diameter; and the second valve seat, provided on the valve plunger, is disposed inwardly of the cylindrical portion and between the first and second elastic members.

3. A booster according to claim 2 in which the first annular member is formed with an axially rearwardly extending tubular portion, an inner periphery of which is successively increased in diameter to define a pair of steps, the seal member being formed by the second elastic member, an annular projection being formed on a front end face of the second elastic member;

the annular projection on the second elastic member being disposed in abutment against a face of one of the steps which is located forwardly, the second annular member being fitted into the inner periphery of one of the steps which is located rearwardly and disposed in abutment against the other stepped end face which is located rearwardly.

4. A booster according to one of claim 2 in which the first valve seat on the valve body comprises a spherical recess, and the first seat area which moves into engagement with or disengagement from the first valve seat comprises an annular projection formed on the first elastic member.

5. A booster according to claim 2 in which the inner peripheral surface of the valve body is formed with a plurality of ribs which extend axially rearward at a location rearward of the first valve seat, an outer periphery of the first annular member slidably fitting over the plurality of ribs.

6. A booster according to claim 5 in which a spring which urges one of the first and second seat areas of the valve element into seating engagement with the respective one of the first and second valve seats is disposed between the second annular member, which defines the valve element, and the input shaft.

7. A booster according to claim 5 in which a spring which urges either seat area of the valve element into seating engagement with the respective valve seat is generally cylindrical in configuration, and is disposed between a retainer, which is used to secure an end of the valve element to the valve body, and the second annular member.

* * * * *

UNITED STATES PATENT AND TRADEMARK OFFICE
CERTIFICATE OF CORRECTION

PATENT NO. : 5 651 300
DATED : July 29, 1997
INVENTOR(S) : Masahiro IKEDA, et al.

It is certified that error appears in the above-indentified patent and that said Letters Patent is hereby corrected as shown below:

Column 10, line 11; delete "one of".

Signed and Sealed this

Eleventh Day of November, 1997

Attest:

BRUCE LEHMAN

Attesting Officer

Commissioner of Patents and Trademarks